United States Patent
Yee

(10) Patent No.: US 10,569,172 B2
(45) Date of Patent: Feb. 25, 2020

(54) SYSTEM AND METHOD OF CONFIGURING A VIRTUAL CAMERA

(71) Applicant: CANON KABUSHIKI KAISHA, Tokyo (JP)

(72) Inventor: Belinda Margaret Yee, Balmain (AU)

(73) Assignee: Canon Kabushiki Kaisha, Tokyo (JP)

( * ) Notice: Subject to any disclaimer, the term of this patent is extended or adjusted under 35 U.S.C. 154(b) by 210 days.

(21) Appl. No.: 15/709,327

(22) Filed: Sep. 19, 2017

(65) Prior Publication Data

US 2019/0083885 A1    Mar. 21, 2019

(51) Int. Cl.
| | |
|---|---|
| A63F 13/52 | (2014.01) |
| A63F 13/30 | (2014.01) |
| A63F 13/2145 | (2014.01) |
| G06F 3/0488 | (2013.01) |
| A63F 13/92 | (2014.01) |
| A63F 13/25 | (2014.01) |
| G06T 15/20 | (2011.01) |
| A63F 13/40 | (2014.01) |
| G06F 3/0481 | (2013.01) |
| G06F 3/01 | (2006.01) |
| G06F 3/0484 | (2013.01) |
| G06F 1/16 | (2006.01) |
| H04N 21/00 | (2011.01) |

(52) U.S. Cl.
CPC .......... *A63F 13/52* (2014.09); *A63F 13/2145* (2014.09); *A63F 13/25* (2014.09); *A63F 13/30* (2014.09); *A63F 13/40* (2014.09); *A63F 13/92* (2014.09); *G06F 1/1694* (2013.01); *G06F 3/011* (2013.01); *G06F 3/04815* (2013.01); *G06F 3/04845* (2013.01); *G06F 3/04847* (2013.01); *G06F 3/04883* (2013.01); *G06T 15/20* (2013.01); *H04N 21/00* (2013.01)

(58) Field of Classification Search
None
See application file for complete search history.

(56) References Cited

U.S. PATENT DOCUMENTS

| | | | |
|---|---|---|---|
| 8,310,537 B2 | 11/2012 | Marti et al. | |
| 9,223,408 B2 | 12/2015 | McArdle | |
| 9,349,157 B2 | 5/2016 | Gillard et al. | |
| 9,589,354 B2 * | 3/2017 | Wells | G06F 3/017 |
| 2005/0212752 A1 | 9/2005 | Marvit et al. | |
| 2010/0045703 A1 | 2/2010 | Kornmann et al. | |
| 2010/0188503 A1 | 7/2010 | Tsai et al. | |
| 2010/0283742 A1 | 11/2010 | Lam | |
| 2013/0321395 A1 | 12/2013 | Chen et al. | |
| 2014/0002580 A1 | 1/2014 | Bear et al. | |

(Continued)

*Primary Examiner* — Ronald Laneau
(74) *Attorney, Agent, or Firm* — Canon U.S.A., Inc. IP Division

(57) ABSTRACT

A method of controlling a virtual camera comprising displaying, when a device is in a first orientation, a view of a scene on the device. A location in the scene is determined while the device is in the first orientation, based on user input detected on the device. Controls for the virtual camera on the device are configured to control the virtual camera in response to detecting that an orientation of the device has changed from the first orientation to a second orientation, the configuration of the controls being based on the determined location. Commands for the configured controls are received to control the virtual camera.

24 Claims, 9 Drawing Sheets

(56) References Cited

U.S. PATENT DOCUMENTS

| | | |
|---|---|---|
| 2015/0241980 A1 | 8/2015 | Jeon |
| 2015/0363967 A1 | 12/2015 | Wells et al. |
| 2017/0232343 A1 | 8/2017 | Yoshioka |
| 2018/0160049 A1* | 6/2018 | Aizawa ................ H04N 5/2224 |
| 2018/0204381 A1* | 7/2018 | Kanatsu ............... H04N 13/282 |

* cited by examiner

SYSTEM AND METHOD OF CONFIGURING A VIRTUAL CAMERA

TECHNICAL FIELD

The present invention relates to control of virtual cameras and, in particular, to the generation of virtual camera views and the control of virtual camera settings through interaction means. The present invention also relates to a method and apparatus for controlling a virtual camera, and to a computer program product including a computer readable medium having recorded thereon a computer program for controlling a virtual camera.

BACKGROUND

Image based rendering allows synthesis of a virtual viewpoint from a collection of camera images. For example, in an arrangement where a subject is surrounded by a ring of physical cameras, a new (virtual camera) view of the subject, corresponding to a position in between (physical camera) captured views, can be synthesised from the captured views or video streams if sufficient knowledge of the camera configuration and the scene captured by the physical cameras is available.

In recent times, the ability to synthesise an arbitrary viewpoint has been promoted for the purpose of "free viewpoint" video. In "free viewpoint" video, the viewer is able to actively adjust the camera viewpoint to his or her preference within constraints of the video capture system. Alternatively, a video producer or camera person may employ free viewpoint technology to construct a viewpoint for a passive broadcast audience. In the case of sport broadcast, a producer or camera person is tasked with constructing virtual camera viewpoints in an accurate and timely manner in order to capture the relevant viewpoint during live broadcast of the sport.

Industry standard methods of positioning virtual cameras in virtual environments, such as methods employed in 3D modelling software, used for product concept generation and rendering such as 3D Studio Max, Blender, and so forth, are known. In such systems, virtual cameras are configured by selecting, moving and dragging the virtual camera, a line of sight of the virtual camera, or both the virtual camera and the line of sight of the virtual camera. The movement of the camera may be constrained by changing the angle from which a three dimensional (3D) world is viewed, by using a 3D positioning widget or by activating constraints in the user interface (UI) (e.g. selecting an active plane). Clicking and dragging with a mouse to set both the camera position and line of sight (orientation) in the 3D environment is possible. However, editing other camera settings such as field of view or focal distance is done using user interface controls.

Methods of moving physical cameras in the real world such as remote control of cable cam and drone based cameras, or other robotic cameras, are known. The methods involving remote controls may be used to configure virtual cameras in real or virtual environments, such as for movie special effects sequences or console games. Configuring cable cam and drone cameras involves using one or more joysticks or other hardware controller to change the position and viewpoint of the cameras. The cable cam and drone systems can position cameras accurately but not quickly, as time is required to navigate the camera(s) into position. The delay caused by navigation makes the remote control systems less responsive to the action on a sports field, playing arena, or stadium which can often be fast-paced. Changing other camera settings such as zoom (field of view), focal distance (focus) is achieved by simultaneously manipulating other hardware controllers such as 'zoom rockers' or 'focus wheels'. Manipulating the hardware controllers often requires two hands, sometimes two operators (four hands), and is time consuming.

Another known method of configuring virtual cameras involves navigating a space using virtual reality headgear, mobile phones or tablet computers, which present to the user an appearance of being present in a virtual scene. The virtual reality headgear, mobile phones or tablet computers can respond to motions of the user so as to maintain the illusion of looking into a virtual space, by matching motions of the device to compensatory changes to the position and orientation of the virtual camera in the virtual scene. Typically, the virtual camera motions are matched to the motions of the user using inertial navigation methods such accelerometers, tracking the surrounds using a camera, or using a GPS unit to locate the user in a large space such as a city.

The camera control interactions described above are typically inappropriate for applications, such as sport broadcast, as camera navigation using the interaction and systems described above is relatively time consuming or unable to follow fast action in real time. There remains an unmet need in virtual camera control for a method of generating and controlling a virtual camera view in an accurate and timely manner.

SUMMARY

It is an object of the present invention to substantially overcome, or at least ameliorate, at least one disadvantage of present arrangements.

Disclosed are arrangements for controlling virtual cameras and for generating virtual camera views. In the disclosed arrangements, virtual camera settings may be controlled through interaction using orientation of a mobile device. A view of a scene may be displayed on a mobile computing device while in one orientation, and locations within a scene may be determined in response to user input entered using the mobile computing device. After reorienting the mobile computing device, the locations within a scene may be used to configure virtual camera controls with which the user can control a virtual camera using the mobile computing device.

In one arrangement, the user input may be used to define a path along which a virtual camera may later travel through a simulated scene. After reorienting the device, a virtual camera viewfinder may be displayed depicting the scene from the point of view of the virtual camera, and the virtual camera may be controlled by the user such that the virtual camera travels along the previously defined path. Parameters and attributes of the virtual camera which have not been constrained by the definition of the path may be freely controlled by the user using various controls configured by the system, allowing, for example, correct framing of a subject.

According to one aspect of the present disclosure, there is provided a method of controlling a virtual camera, the method comprising:

displaying, when a device is in a first orientation, a view of a scene on the device;

determining a location in the scene while the device is in the first orientation, based on user input detected on the device;

configuring controls for the virtual camera on the device to control the virtual camera in response to detecting that an orientation of the device has changed from the first orientation to a second orientation, the configuration of the virtual camera controls being based on the determined location; and receiving commands for the configured controls to control the virtual camera.

According to another aspect of the present disclosure, there is provided a non-transitory computer-readable medium having a computer program stored thereon for configuring a virtual camera, the method comprising:

code for displaying, when a device is in a first orientation, a view of a scene on the device;

code for determining a location in the scene while the device is in the first orientation, based on user input detected on the device;

code for configuring controls for the virtual camera on the device to control the virtual camera in response to detecting that an orientation of the device has changed from the first orientation to a second orientation, the configuration of the virtual camera controls being based on the determined locations; and code for receiving commands for the configured controls to control the virtual camera.

According to still another aspect of the present disclosure, there is provided a system comprising:

an interface;
a display;
a memory; and
a processor, wherein the processor is configured to execute code stored on the memory for implementing a method of configuring a virtual camera, the method comprising:
  displaying, when a device is in a first orientation, a view of a scene on the device;
  determining a location in the scene while the device is in the first orientation, based on user input detected on the device;
  configuring controls for the virtual camera on the device to control the virtual camera in response to detecting that an orientation of the device has changed from the first orientation to a second orientation, the configuration of the virtual camera controls being based on the determined locations; and
  receiving commands for the configured controls to control the virtual camera.

According to still another aspect of the present disclosure, there is provided a tablet device adapted to configure a virtual camera, comprising:

a touchscreen;
a memory;
a processor configured to execute code stored on the memory to:
  display, when a device is in a first orientation, a view of a scene on the device;
  determining a location in the scene while the device is in the first orientation, based on user input detected on the device;
  configuring controls for the virtual camera on the device to control the virtual camera in response to detecting that an orientation of the device has changed from the first orientation to a second orientation, the configuration of the virtual camera controls being based on the determined locations; and
  receive commands for the configured controls to control the virtual camera.

According to still another aspect of the present disclosure, there is provided a method of controlling a remote device, the method comprising:

displaying, when a device is in a first orientation, a first user interface, the first user interface comprising a first view of a scene;

receiving a user input on the device defining a location in the first view of the scene while the device is in the first orientation displaying the first user interface, the defined location being associated with predetermined constraints for operating the remote device; and in response to detecting an orientation of the device has changed from the first orientation to a second orientation, configuring controls of the remote device based on the defined location in accordance with the predetermined constraints to capture a second view of the scene.

According to still another aspect of the present disclosure, there is provided a method of controlling a device, the method comprising:

displaying, when a device is in a first orientation, a first user interface;

while the device is in the first orientation displaying the first user interface, receiving a user input on the device defining interpretation of a further user input when the device is in a second orientation; and in response to detecting an orientation of the device has changed from the first orientation to the second orientation, controlling the device using a second user interface, wherein at least one user input in relation to the second user interface is interpreted based on the defined interpretation.

Other aspects of the invention are also disclosed.

BRIEF DESCRIPTION OF THE DRAWINGS

One or more example embodiments of the invention will now be described with reference to the following drawings, in which.

DETAILED DESCRIPTION

Figure 1:
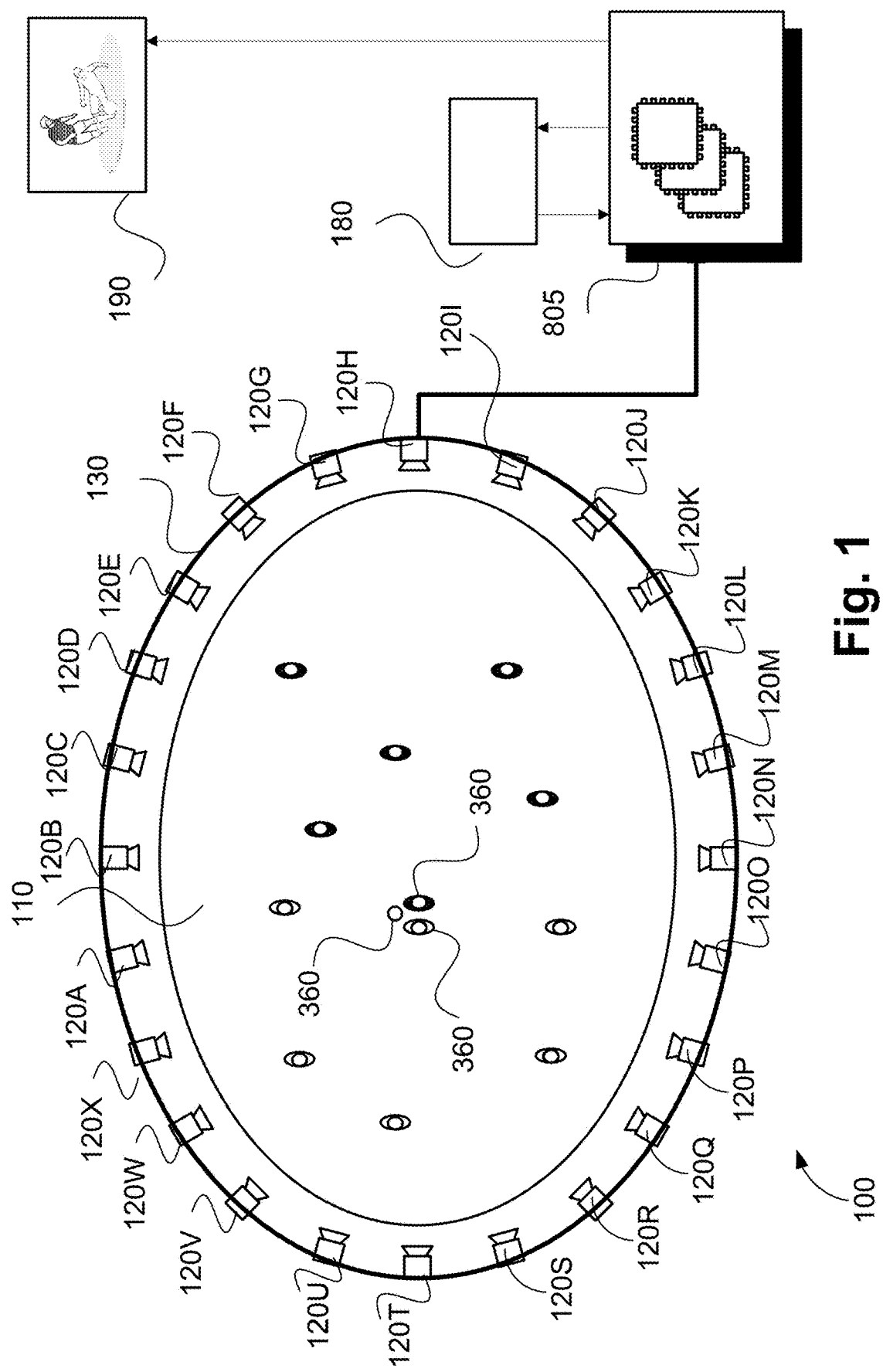
FIG. 1 shows an arrangement of networked video cameras surrounding a sports stadium.

Where reference is made in any one or more of the accompanying drawings to steps and/or features, which have the same reference numerals, those steps and/or features have for the purposes of this description the same function(s) or operation(s), unless the contrary intention appears.

Known methods of generating and controlling a virtual camera view are often unsuitable for applications which require relatively quick virtual camera configuration, such as live sports broadcast.

Figure 8A:
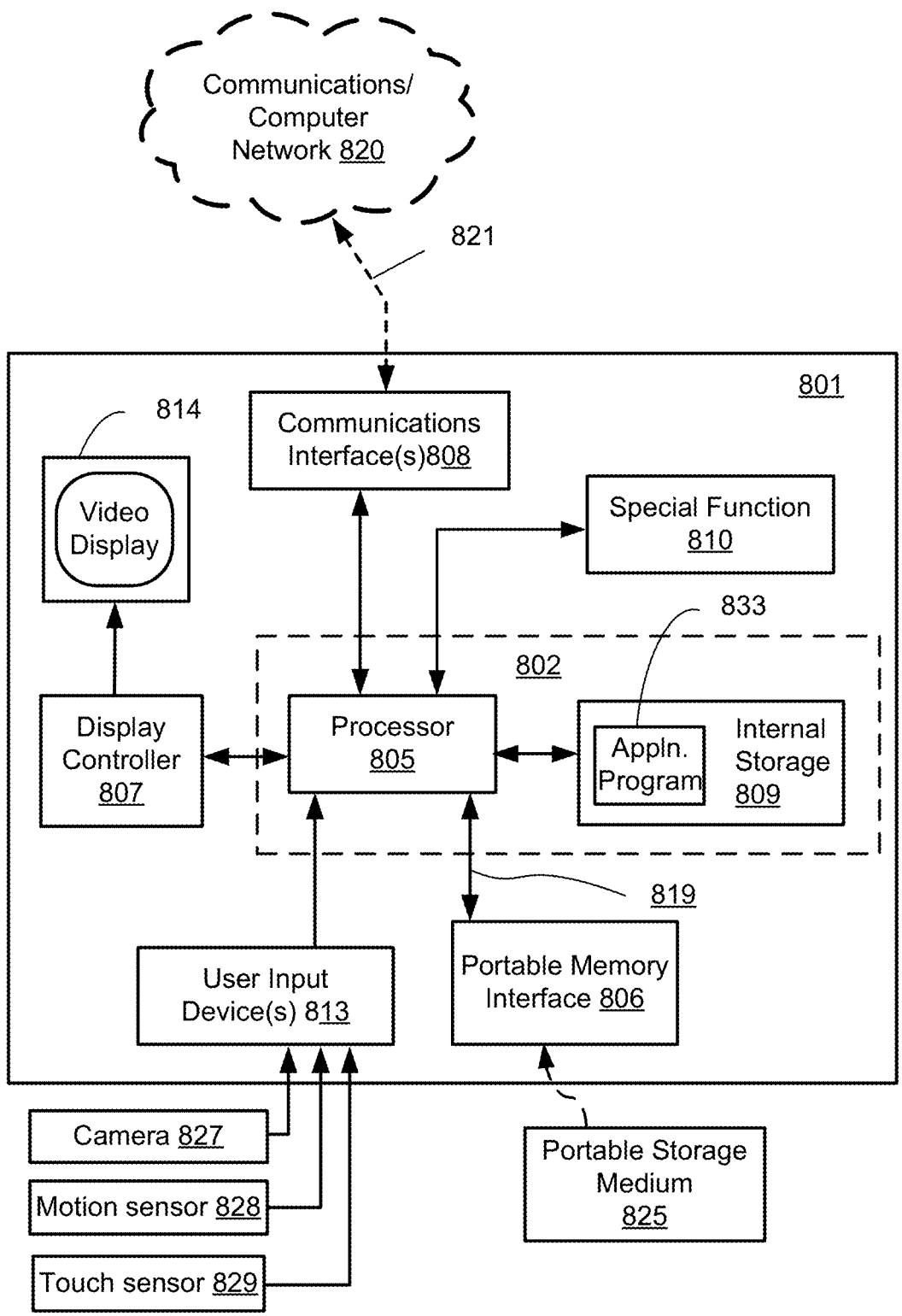
FIGS. 8A and 8B collectively form a schematic block diagram representation of an electronic device upon which described arrangements can be practised.
Figure 8B:
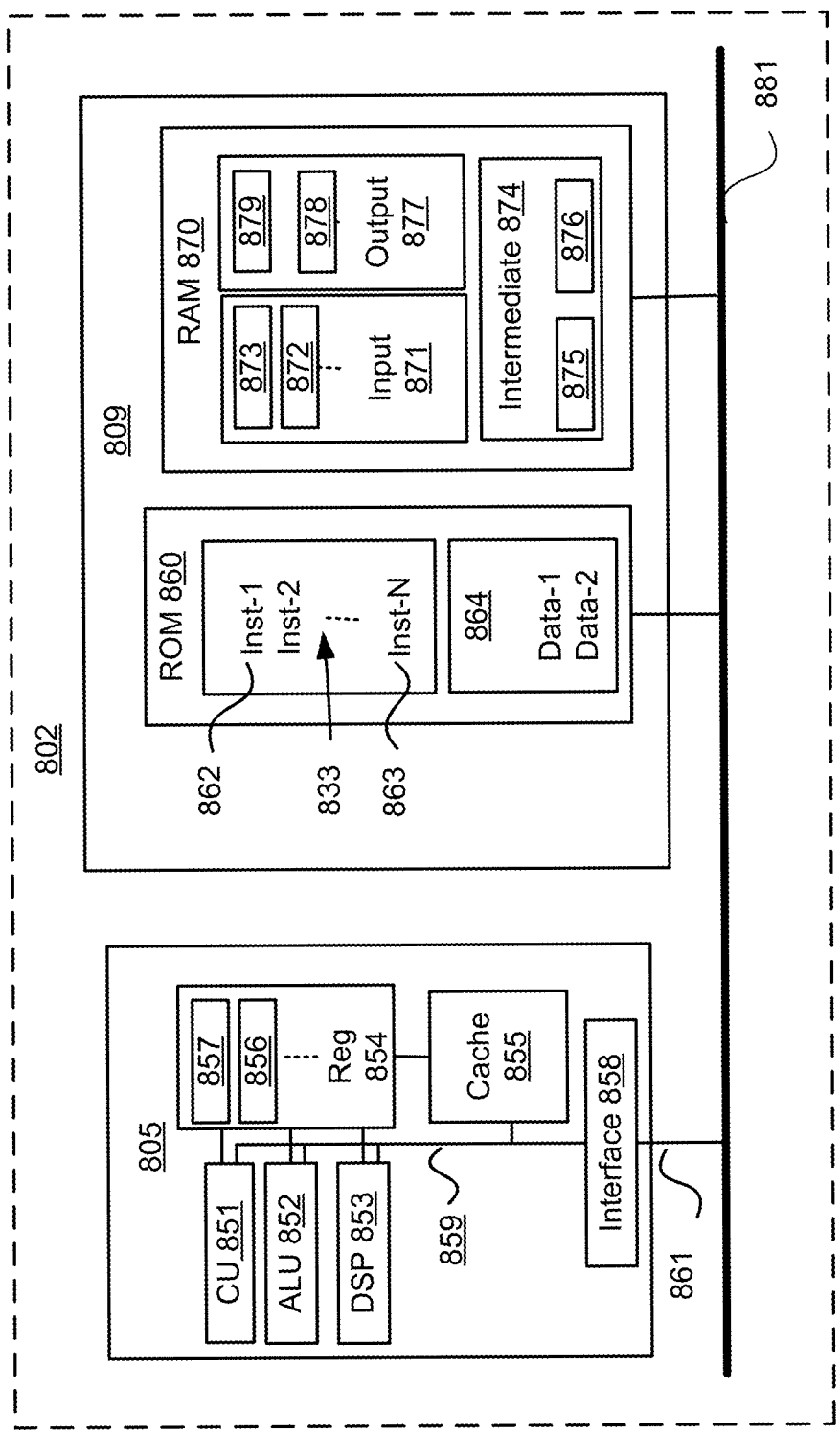

In arrangements described herein, definition of characteristics of a remote device, such as a virtual camera, is achieved by a user making a gesture using an interface such as a touchscreen. Attributes of the gesture define multiple characteristics of the virtual camera. The gesture allows a virtual camera to be set up in timeframes required by a responsive virtual sport broadcast system. Furthermore, a change of orientation of a device (e.g., a general purpose electronic device 801 as shown in FIGS. 8A and 8B) allows the previously defined characteristics of the virtual camera to be used in a new interaction mode, possibly with new or additional characteristics of the virtual camera being defined through user interaction with the device in a new mode.

Methods described herein are adapted for use in the context of a performance arena 110 a sports or similar performance field as shown in FIG. 1. FIG. 1 shows a system 100 comprising the arena 110 centred on a real physical playing field that is approximately rectangular, oval or circular. The shape of the arena 110 allows the arena 110 to be surrounded by one or more rings of physical cameras 120A to 120X. As seen in FIG. 1, the arena 110 includes a single ring of cameras 120A-120X. Each of the cameras 120A-120X is physically located at a respective predetermined location with respect to the arena 110. In the example system 100, the arena 110 is a field. However, in another arrangement, the arena 110 may be a music stage, theatre, a public or a private venue, or any venue having a similar arrangement of physical cameras and a known spatial layout. For example, the arrangements described may also be used for surveillance in an area such as a train station platform.

The arena 110, in the example of FIG. 1, contains objects 140. Each of the objects 140 can be a person, a ball, a vehicle or any structure on or near the arena 110. The cameras 120A to 120X are synchronised to capture frames at the same instants in time so that all points on the arena 110 are captured simultaneously from a large number of points of view (viewpoints).

In some variations, the full ring of cameras as shown in FIG. 1 is not used, but rather some subset(s) of the ring of cameras may be used. The arrangement using subsets of the ring of cameras may be advantageous when certain viewpoints are known to be unnecessary ahead of time.

Video frames captured by the cameras 120A-120X are subject to processing and temporary storage near the cameras 120A-120X prior to being made available, via a network connection 821, to a processor 805 (see FIGS. 8A and 8B) configured for performing video processing. The processor 805 receives controlling input from an interface of a controller 180 that specifies position, orientation, zoom and possibly other simulated camera features for a virtual camera. The virtual camera represents a location, direction and field of view generated from video data received from the cameras 120A to 120X. The controller 180 recognizes touch input from the user. Recognition of touch input from the user can be achieved through a number of different technologies, such as capacitance detection, resistance detection, conductance detection, vision detection and the like. The processor 805 is configured to synthesise a specified virtual camera perspective view 190 based on the video streams available to the processor 805 and display the synthesised perspective on a video display 814. The video display 814 may be one of a variety of configurations for example, a touchscreen display, or a virtual reality headset. If the video display 814 is a touchscreen, the video display 814 may also provide the interface of the controller 180. The virtual camera perspective view represents frames of video data resulting from generation of the virtual camera.

"Virtual cameras" are referred to as virtual because the functionality of the virtual cameras is computationally derived by methods such as interpolation between cameras or by rendering from a virtual modelled three dimensional (3D) scene constructed using data from many cameras (such as the cameras 120A to 120X) surrounding the scene (such as the arena 110), rather than simply the output of any single physical camera.

A virtual camera position input may be generated by a human virtual camera operator and be based on input from a user interface device such as a joystick, mouse or similar controller including dedicated controllers comprising multiple input components. Alternatively, the camera position may be generated fully automatically based on analysis of game play. Hybrid control configurations are also possible whereby some aspects of the camera positioning are directed by a human operator and others by an automated algorithm. For example, coarse positioning may be performed by a human operator and fine positioning, including stabilisation and path smoothing, may be performed by an automated algorithm.

The processor 805 may be configured to achieve frame synthesis using any suitable image based rendering method. Image based rendering methods may be based on sampling pixel data from the set of cameras 120A to 120X of known geometric arrangement. The rendering methods combine the sampled pixel data information into a synthesised frame. In addition to sample based rendering of a requested frame, the processor 805 may be additionally configured to perform synthesis, 3D modelling, in-painting or interpolation of regions as required covering sampling deficiencies and to create frames of high quality visual appearance. An example video view 190 created by the processor 805 may subsequently be provided to a production desk (not depicted) so that video streams received from the cameras 120A to 120X can be edited together to form a broadcast video. Alternatively, the virtual camera perspective view 190 may be broadcast unedited or stored for later compilation.

The processor 805 may also be configured to perform image analysis including object detection and object tracking on video data captured by the cameras 120A to 120X. In particular, the processor 805 may be used to detect and track objects in a virtual camera field of view.

The flexibility afforded by the arrangement of FIG. 1 described above presents a secondary set of problems not previously anticipated in live video coverage using physical cameras. In particular, as described above problems have been identified in, how to generate a virtual camera anywhere on a sports field, at any time in response to action on the field.

FIGS. 8A and 8B collectively form a schematic block diagram of a general purpose electronic device 801 including embedded components, upon which the methods to be described are desirably practiced. In one arrangement, the controller 180 of FIG. 1 forms part of the electronic device 801 (e.g., a tablet device). In other arrangements, the controller 180 may form part of a separate device (e.g., a tablet) to the processor 805 (e.g., a cloud server), where the separate devices are in communication over a network such as the internet.

The electronic device 801 may be, for example, a mobile phone or a tablet, in which processing resources are limited. Nevertheless, the methods to be described may also be performed on higher-level devices such as desktop computers, server computers, and other such devices with significantly larger processing resources.

As seen in FIG. 8A and FIG. 8B, the device 801 comprises the processor (or processing unit) 805 which is bi-directionally coupled to an internal storage module 809. The storage module 809 may be formed from non-volatile semiconductor read only memory (ROM) 860 and semiconductor random access memory (RAM) 870, as seen in FIG. 8B. The RAM 870 may be volatile, non-volatile or a combination of volatile and non-volatile memory. Both ROM and RAM modules may be coupled via means of a data bus or other means to the processor 805.

The electronic device 801 includes a display controller 807, which is connected to a video display 814, such as a liquid crystal display (LCD) panel or the like. The display controller 807 is configured for displaying graphical images on the video display 814 in accordance with instructions received from the embedded controller 802, to which the display controller 807 is connected.

The electronic device 801 also includes user input devices 813 which are typically formed by keys, a keypad or like controls. In one arrangement, the user input devices 813 include a touch sensor 829 physically associated with the video display 814 to collectively form a touch-screen. The touch-screen may thus operate as one form of graphical user interface (GUI) as opposed to a prompt or menu driven GUI typically used with keypad-display combinations. Other forms of user input devices may also be used, such as a microphone (not illustrated) for voice commands or a joystick/thumb wheel (not illustrated) for ease of navigation about menus. In the arrangements described, the video display 814 and touch sensor 829 forms a touchscreen interface of the controller 180 via which gestures are received to configure control of the virtual camera.

As seen in FIG. 8A, the electronic device 801 also comprises a portable memory interface 806, which is coupled to the processor 805 via a connection 819. The portable memory interface 806 allows a source or destination of data to supplement the internal storage module 809. Examples of such interfaces permit coupling with portable memory devices such as Universal Serial Bus (USB) memory devices, Secure Digital (SD) cards, Personal Computer Memory Card International Association (PCMIA) cards, optical disks and magnetic disks.

The electronic device 801 also has a communications interface 808 to permit coupling of the device 801 to a computer or communications network 820 via a connection 821. The connection 821 may be wired or wireless. For example, the connection 821 may be radio frequency or optical. An example of a wired connection includes Ethernet. Further, an example of wireless connection includes Bluetooth™ type local interconnection, Wi-Fi (including protocols based on the standards of the IEEE 802.11 family), Infrared Data Association (IrDa) and the like. The physical cameras 120A to 120X typically communicate with the electronic device 801 via the connection 821.

Typically, the electronic device 801 is configured to perform some special function. For example, where the device 801 is a tablet, the component 829 may represent a hover sensor or a touchscreen of the tablet.

As another example, the device 801 may be a mobile telephone handset. In this instance, the Communication Interface(s) 808 may provide communications in a cellular telephone environment.

Where the device 801 is a portable device, the motion sensor 828 and/or a camera 827 may provide capabilities for sensing spatial location, distance, orientation, speed, acceleration, gravity, magnetism, sonar, radar, or changes in those, using methods known in the art such as feature point disparity, time-of-flight sensing, laser range-finding, capacitive touch sensing, accelerometer measurements, and so on.

Where the device 801 is a media player, the Display Controller 807 may include a number of encoders and decoders of a type including Joint Photographic Experts Group (JPEG), (Moving Picture Experts Group) MPEG, MPEG-1 Audio Layer 3 (MP3), and the like.

Figure 2:
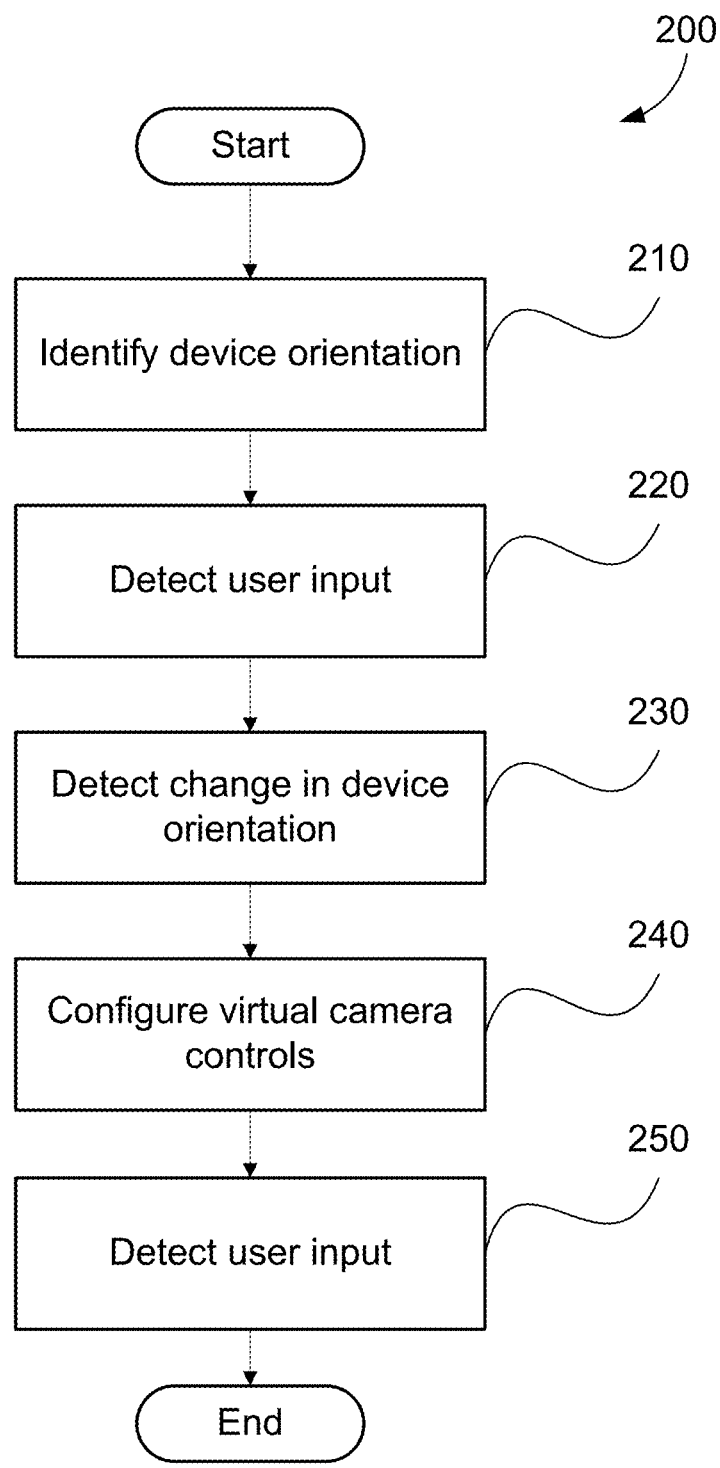
FIG. 2 shows a schematic flow diagram of a method of controlling a virtual camera.

The methods described hereinafter may be implemented using the embedded controller 802, where the process of FIG. 2 may be implemented as one or more software application programs 833 executable within the embedded controller 802. The electronic device 801 of FIG. 8A implements the described methods. In particular, with reference to FIG. 8B, the steps of the described methods are effected by instructions in the software 833 that are carried out within the controller 802. The software instructions may be formed as one or more code modules, each for performing one or more particular tasks. The software may also be divided into two separate parts, in which a first part and the corresponding code modules performs the described methods and a second part and the corresponding code modules manage a user interface between the first part and the user.

The software 833 of the embedded controller 802 is typically stored in the non-volatile ROM 860 of the internal storage module 809. The software 833 stored in the ROM 860 can be updated when required from a computer readable medium or via a network. The software 833 can be loaded into and executed by the processor 805. In some instances, the processor 805 may execute software instructions that are located in RAM 870. Software instructions may be loaded into the RAM 870 by the processor 805 initiating a copy of one or more code modules from ROM 860 into RAM 870. Alternatively, the software instructions of one or more code modules may be pre-installed in a non-volatile region of RAM 870 by a manufacturer. After one or more code modules have been located in RAM 870, the processor 805 may execute software instructions of the one or more code modules.

The application program 833 is typically pre-installed and stored in the ROM 860 by a manufacturer, prior to distribution of the electronic device 801. However, in some instances, the application programs 833 may be supplied to the user encoded on external storage media 825 and read via the portable memory interface 806 of FIG. 8A prior to storage in the internal storage module 809. In another alternative, the software application program 833 may be read by the processor 805 from the network 820, or loaded into the processor 805 or the portable storage medium 825 from other computer readable media. Computer readable storage media refers to any non-transitory tangible storage medium that participates in providing instructions and/or data to the controller 802 for execution and/or processing. Examples of such storage media include floppy disks, magnetic tape, CD-ROM, a hard disk drive, a ROM or integrated circuit, USB memory, a magneto-optical disk, flash memory, or a computer readable card such as a PCMCIA card and the like, whether or not such devices are internal or external of the device 801. Examples of transitory or non-tangible computer readable transmission media that may also participate in the provision of software, application programs, instructions and/or data to the device 801 include radio or infra-red transmission channels as well as a network connection to another computer or networked device, and the Internet or Intranets including e-mail transmissions and information recorded on Websites and the like. A computer readable medium having such software or computer program recorded on it is a computer program product.

The second part of the application programs 833 and the corresponding code modules mentioned above may be executed to implement one or more graphical user interfaces (GUIs) to be rendered or otherwise represented upon the display 814 of FIG. 8A. Through manipulation of user input devices 827, 828, and 829, a user of the device 801 and the application programs 833 may manipulate the interface in a functionally adaptable manner to provide controlling commands and/or input to the applications associated with the GUI(s). Other forms of functionally adaptable user interfaces may also be implemented, such as an audio interface utilizing speech prompts output via loudspeakers (not illustrated) and user voice commands input via a microphone (not illustrated).

FIG. 8B illustrates in detail the embedded controller 802 having the processor 805 for executing the application programs 833 and the internal storage 809. The internal storage 809 comprises read only memory (ROM) 860 and random access memory (RAM) 870. The processor 805 is able to execute the application programs 833 stored in one or both of the connected memories 860 and 870. When the electronic device 801 is initially powered up, a system program resident in the ROM 860 is executed. The application program 833 when permanently stored in the ROM 860 is sometimes referred to as "firmware". Execution of the firmware by the processor 805 may fulfil various functions, including processor management, memory management, device management, storage management and user interface.

The processor 805 typically includes a number of functional modules including a control unit (CU) 851, an arithmetic logic unit (ALU) 852, optionally a digital signal processor (DSP) 853, and a local or internal memory comprising a set of registers 854 which typically contain data elements 856, 857, along with internal buffer or cache memory 855. One or more internal buses 859 interconnect these functional modules. The processor 805 typically also has one or more interfaces 858 for communicating with external devices via system bus 881, using a connection 861.

The application program 833 includes a sequence of instructions 862 through 863 that may include conditional branch and loop instructions. The program 833 may also include data, which is used in execution of the program 833. This data may be stored as part of the instruction or in a separate location 864 within the ROM 860 or RAM 870.

In general, the processor 805 is given a set of instructions, which are executed therein. This set of instructions may be organised into blocks, which perform specific tasks or handle specific events that occur in the electronic device 801. Typically, the application program 833 waits for events and subsequently executes the block of code associated with that event. Events may be triggered in response to input from a user, via the user input devices connected through an I/O interface 813 of FIG. 8A, as detected by the processor 805. Events may also be triggered in response to other sensors and interfaces in the electronic device 801.

The execution of a set of the instructions may require numeric variables to be read and modified. Such numeric variables may be stored in the RAM 870. The disclosed methods use input variables 871 that are stored in known locations 872, 873 in the memory 870. The input variables 871 are processed to produce output variables 877 that are stored in known locations 878, 879, in the memory 870. Intermediate variables 874 may be stored in additional memory locations in locations 875, 876, of the memory 870. Alternatively, some intermediate variables may only exist in the registers 854 of the processor 805.

The execution of a sequence of instructions is achieved in the processor 805 by repeated application of a fetch-execute cycle. The control unit 851 of the processor 805 maintains a register called the program counter, which contains the address in ROM 860 or RAM 870 of the next instruction to be executed. At the start of the fetch execute cycle, the contents of the memory address indexed by the program counter is loaded into the control unit 851. The instruction thus loaded controls the subsequent operation of the processor 805, causing for example, data to be loaded from ROM memory 860 into processor registers 854, the contents of a register to be arithmetically combined with the contents of another register, the contents of a register to be written to the location stored in another register and so on. At the end of the fetch execute cycle the program counter is updated to point to the next instruction in the system program code. Depending on the instruction just executed this may involve incrementing the address contained in the program counter or loading the program counter with a new address in order to achieve a branch operation.

Each step or sub-process in the processes of the methods described below is associated with one or more segments of the application program 833, and is performed by repeated execution of a fetch-execute cycle in the processor 805 or similar programmatic operation of other independent processor blocks in the electronic device 801.

In the arrangements described, the controller 180 relates to the screen 814 of the tablet device 801. The video display 814 and sensor 829 provide an interface with which the user may interact with a displayed representation of the arena 110, and watch video footage associated with the arena 110.

A method 200 of controlling a virtual camera will now be described with reference to FIG. 2. The method 200 may be implemented as one or more software code modules of the software application program 833 resident in the ROM 860 and/or RAM 870 of the device 801 and being controlled in its execution by the processor 805. The method 200 will be described with reference to controlling a virtual camera. However, the method 200 and other methods described below may be used for controlling any remote device which may take the form of a virtual camera or a physical camera (e.g., 120A).

The method 200 begins at identifying step 210, where an orientation of the electronic device 801 is identified under execution of the processor 805. For example, the electronic device 801 may be held in an orientation by a user, and the device orientation is identified at step 210. The orientation is typically identified passively through use of sensors such as accelerometer, camera, gravity sensor, etc. The orientation may be identified relative to the direction of gravity, or relative to the orientation of the user, or relative to surrounds of the user, and so on, or to a combination of these methods. In a microgravity situation, such as aboard a space station, the orientation of the device 801 may be identified relative to whatever current accelerometer measurements of the device 801 specify. A change in the accelerometer measurements of the device 801 may later be determined without necessarily requiring a particular external orientation reference. A change in device orientation as identified at step 210 may later be sensed in step 230 as described below.

The method 200 continues at detecting step 220, where user input at a user interface of the device 801 is detected under execution of the processor 805. Step 220 typically incorporates several useful properties. Typically, the device 801 displays a relevant view of a scene when the device 801 is in a first orientation. For example, when the device 801 is oriented substantially parallel to the ground (i.e., perpendicular to the direction of gravity where the direction of gravity is determined either from the accelerometer, image sensor, gravity sensor or other sensors), a top-down view (or helicopter view) of a scene may be displayed on the display 814. The scene may be a pre-recorded three-dimensional recording of a scene, or a live view of a scene, or some other representation of a scene such as a two dimensional (2D) diagram, an architectural rendering, a schematic, a graphic, or some other visual abstraction. In another arrangement, the orientation of the device 801 relative to a longitude axis of a user's face may be used to select a relevant view of the scene. Additionally, a transverse axis running through the user's eyes may be used to determine an orientation of the device 801 relative to the user. For example, if the longitude axis of the face is oriented at an angle below forty five (45) degrees relative to the device 801, the device 801 is considered to be oriented substantially vertical and a side-on view may be displayed. If, however, the longitude axis of the face is oriented at an angle exceeding forty five (45) degrees relative to the device 801, the device 801 is considered to be oriented substantially parallel to the ground and a top-down view may be displayed on the video display 814 of the device 801.

When the longitude axis is oriented parallel to the device 801, the angle between the axis and the device 801 is considered to be zero (0) degrees. However, many mappings of device orientation to a displayed view are possible.

As part of step 220, any input from the user is detected under execution of the processor 805. Detecting user input may take the form of detecting touch gestures on a touchscreen.

A path may be defined by the user, using any of several methods. For example, a start and stop point may be indicated; one or more freehand lines may be traced; a shape may be indicated, such as a circle or a rectangle; an area may be swept out using one or more fingers; a sequence of such methods may be specified one after another or concurrently using multiple fingers. The inputs detected at step 220 are used to determine, through association with the view of the scene, one or more locations within the scene. Typically, each such location includes at least a spatial component.

In a further arrangement, locations within the scene are associated with temporal data. The temporal data may be associated with progression of time within the scene. For example, a start point of a gesture may be associated with a particular time within the scene, and a stop point of the gesture may be associated with a later time within the scene.

The speed of the gesture itself may be used to control the temporal data. In another arrangement, the temporal data associated with a location within the scene (i.e., the temporal component of the location) may be explicitly controlled via a timeline control or other interface mechanism.

Locations within the scene may later be used to constrain the motion or operation of a virtual camera as the virtual camera operates within the scene. Typically, the motion or operation is constrained by configuring virtual camera controls such that the determined locations affect the configuration of the virtual camera to apply predetermined constraints when the virtual camera is being moved.

Virtual camera controls may be configured to affect a variety of properties of the virtual camera. A virtual camera may have a position within the scene which corresponds to a viewpoint within a three-dimensional reconstruction of a space. In one arrangement, the space is a representation of a physical place, such as the arena 110 as recorded by the cameras 120A to 120X. In another arrangement, the space may be an architectural model defined within a computer such as the electronic device 801. A virtual camera typically has several attributes defining operation of the virtual camera. The attributes include a position within the space, consisting of spatial components (e.g. X, Y, Z), which may also include orientation values (e.g. yaw, pitch, roll), as well as a temporal component (referred to as time, or timecode). The attributes also include up to several other simulated optical properties such as focal length, zoom, shutter speed, sensitivity (ISO) etc. The attributes are typically used to determine properties including a view frustum, which in one arrangement is a truncated pyramidal shape, involving a near clipping plane and a far clipping plane. Such properties affect the apparent field of view of the virtual camera, and affect the spatiotemporal disposition of the virtual camera for the depiction of events within the scene.

The various attributes of the virtual camera may be controlled by a user, and may be constrained by configuring the virtual camera controls in response to detection of the locations within step 220, as will be described below.

In detecting step 230, a change in the orientation of the device 801 is detected under execution of the processor 205. The change may be detected using any of the same means used originally in step 210 when identifying the orientation of the device 801 as described above. Typically, the change in orientation of the device 801 is initiated by the user. In one arrangement, the user angles the device 801 from an orientation that is substantially perpendicular to the direction of gravity into a new orientation that is substantially parallel to the direction of gravity. Such a change in orientation of the device 801 is used to indicate to the device 801 that a change in mode is to occur. In another arrangement, a virtual camera viewfinder is displayed on the video display 814 as a result of the detection at step 230.

In configuring step 240, in response to detecting an orientation of the device 801 has changed from a first orientation to a second orientation in step 230, the virtual camera controls are configured under execution of the processor 805. Attributes and properties of the virtual camera are controlled by these virtual camera controls. Such attributes and properties of the virtual camera may include the position, orientation, field of view, timecode, focal length, zoom, shutter speed, sensitivity, or other camera properties of the virtual camera, or any subset of position, orientation, field of view, timecode, focal length, zoom, shutter speed, sensitivity for the virtual camera. Furthermore, changes in the values of the attributes of the virtual camera may be controlled in various ways. For example, controlling how the position of the virtual camera may change can affect minimum or maximum speed of the virtual camera. Controlling how the position of the virtual camera may change can also affect acceleration, apparent mass or inertia of the virtual camera through controlling the smoothness of the motion, despite the fact it is a virtual camera with no explicitly modelled mass. Configuration of the virtual camera controls occurs in step 240 and is performed in accordance with the locations determined in step 220.

Configuration of the virtual camera controls may involve, for example, relating an axis of an on-screen control to a specific virtual camera attribute, or associating a user touch gesture with a change in a virtual camera property. Configuration of the virtual camera controls may also involve establishing a mapping between the range of motion of the virtual camera along a spatial, temporal, or other axis, and the range of variability of a user control. Configuration of the virtual camera controls may also involve displaying or hiding particular virtual camera controls, or restricting what virtual camera properties a particular virtual camera control can affect.

In detecting step 250, user input is detected under execution of the processor 805. The user input is used to receive commands to control the virtual camera in accordance with the virtual camera controls configured in step 240. In one arrangement, the controls may be implemented by interpreting user inputs intended to affect the virtual camera in such a way that the required attributes are selectively affected. For example, if virtual camera position was intended to be affected, but not virtual camera orientation, user inputs which might affect orientation may be ignored by the device during step 250. In another arrangement, the display interface may change during or as a result of step 240 such that the user in step 250 is not presented with orientation modification options.

In step 250, in response to detecting user input, the video display 814 is updated through synthesis of an updated virtual camera image. The updating of the display occurs due to the user input being detected, causing changes to one or more attributes or properties of the virtual camera. For example, if the user touches a virtual camera control that has been configured in step 240, and this causes the virtual camera to move in space, synthesis of a new image would occur, showing to the user the newly updated point of view of the virtual camera. The synthesis of virtual camera imagery uses a three-dimensional (3D) model of the scene generated from multiple physical cameras and the position of the virtual camera (usually three spatial dimensions) in scene space as well as the orientation of the virtual camera (usually another three rotational dimensions), and zoom. An image that corresponds to the seven dimensional data for that virtual camera and the corresponding eighth dimension (i.e., the time in the scene which is being visualised) is produced.

Figure 3A:
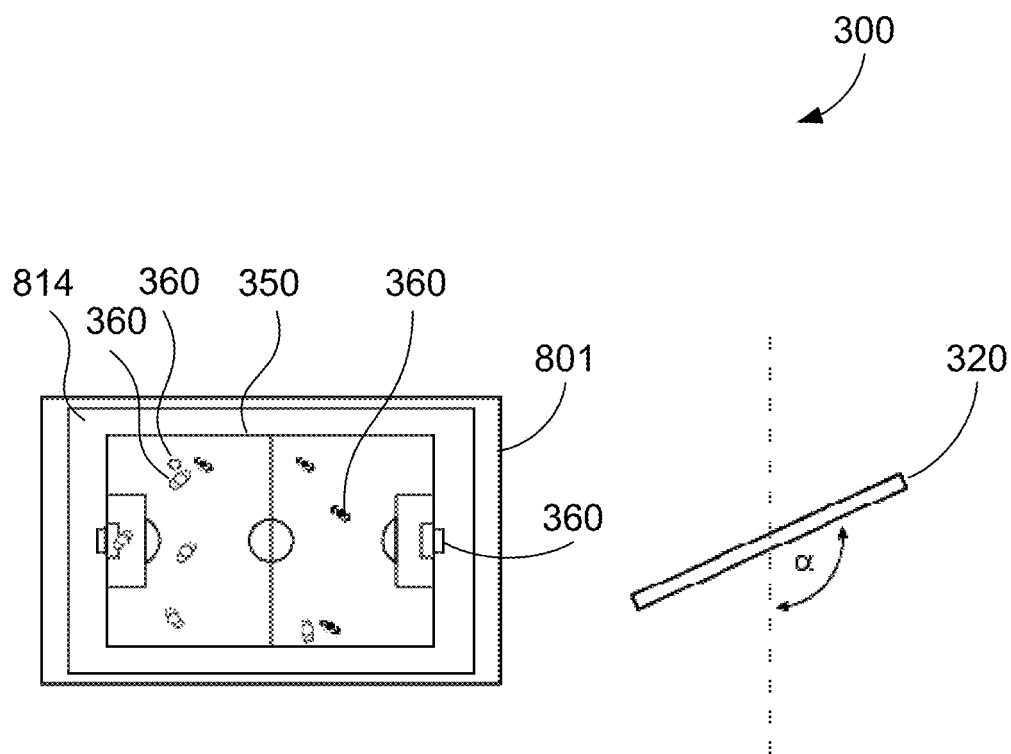
FIG. 3A shows an electronic device at a particular orientation.

FIG. 3A shows the device 801 held at a particular orientation 320 at an angle α from the vertical, which may imply the direction of gravity, in accordance with one example arrangement. The orientation 320 of the device 801 is detected as in step 210. A top-down view of a sports arena 350 is shown on the video display 814 of the device 801. Objects 360 on the arena 350 are shown in miniature. Such objects 360 may include players, a ball, a goal zone, sports field markings, etc. Bird's eye views of the arena 110 as shown in FIG. 3A are useful for navigation purposes, such as when a sports coach is reviewing a game or another situation where large scale motion of people or objects is important to see. The top-down view displayed on the display screen 814 of the device 801 is an example of one mode of the device 801 and allows meaningful user inputs to be detected, as in step 220.

Figure 3B:
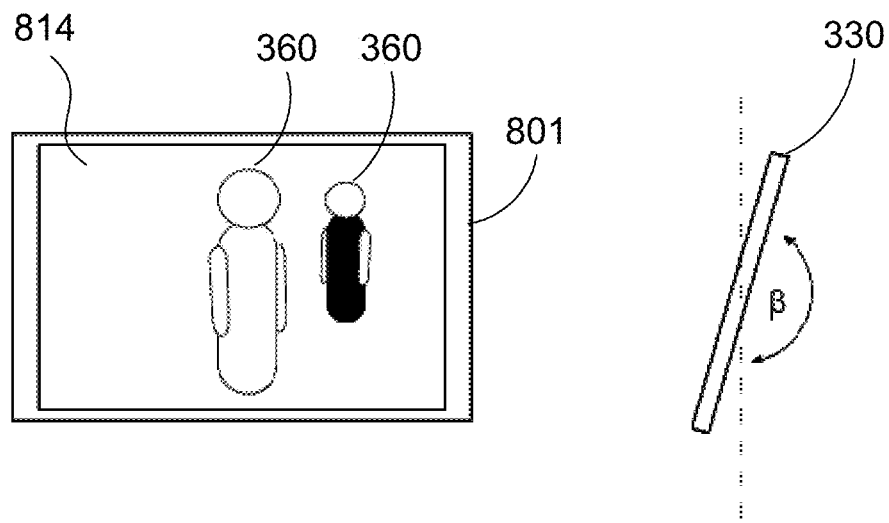
FIG. 3B shows the electronic device of FIG. 3A at a different orientation than the orientation shown in FIG. 3A.

In FIG. 3B, the device 801 has been reoriented to a different orientation 330 from the orientation 320 shown in FIG. 3B. In FIG. 3B, the device 801 is at an angle β from the vertical. The change in orientation of the device 801 as shown in FIG. 3B is detected as in step 230. In the example arrangement shown in FIGS. 3A and 3B, in response to the change in orientation, the view presented to the user on the video display 814 shows that the virtual camera has changed to a front-on view so that the objects 360 can be seen closer and in a more normal way. The view presented to the user in FIG. 3B is one form that a virtual camera viewfinder might take and is an example of another mode of the device 801. Such front-on views, as shown for example in FIG. 3B, are useful for entertainment or identification purposes, as in sports broadcasts, surveillance views, etc. In the example of FIG. 3B, the virtual camera controls are configured as in step 240, and user inputs may be detected as in step 250, in accordance with the configured virtual camera controls.

The transition between first and second modes of the device 801, as shown in FIGS. 3A and 3B, respectively, may be triggered by a change in device orientation that exceeds an angular threshold. For example, the angle α may be an angular threshold below which the device 801 is considered to be in a certain orientation and above which the device 801 is considered to be in a different orientation.

In another arrangement, stability of the transition between orientations may be considered. For example, multiple thresholds or the history of device motion may be used to determine device mode changes, as in a hysteresis curve. Small motions around a particular threshold angle need not trigger an immediate shift back and forth between device modes. Instead, reorienting the device 801 towards a particular orientation may cause a transition from one device mode at a certain threshold angle, and reorienting the device 801 back to another orientation may cause a transition to another device mode at a different threshold angle. For example, if the angle to the direction of gravity of the device 801 exceeds β, the transition from a horizontal mode to a vertical mode may be triggered, whereas the angle to the direction of gravity for the device 801 may need to be reduced to an angle smaller than a to trigger the transition from a vertical mode to a horizontal mode, thus providing stability at angles in between those two extremes. For angles between α and β, the mode does not change. Similarly, history of angular motions of the device 801 may be used to ignore random wobbles or other spurious motions. The history of angular motions of the device 801 may also be used to directly infer when deliberate user moderated change in orientation was intended, using such means as identifying smooth angular changes over a certain minimal or maximum time duration threshold, or other such means.

By configuring certain aspects of the virtual camera controls in the first mode and then shifting to a second mode where those configured controls are used to interactively control the virtual camera, a natural separation of function may be advantageously employed to simplify the workflow for the user. In one arrangement, the top-down view displayed on the video display 814 in the first mode as shown in FIG. 3A enables the user to easily establish navigational controls which can affect how the virtual camera moves. The view displayed on the video display 814 may then switch to a front-on view in the second mode, as shown in FIG. 3B, which allows the user to steer the virtual camera in accordance with previously configured controls. Enabling the views displayed on the display 814 to switch as shown in FIGS. 3A and 3B allows a reduction in the number of hardware devices used for navigating a virtual camera. The method 200 enables a multi-purpose device such as a tablet or a smartphone to facilitate complex navigation in seven degrees of freedom. The example arrangement shown in FIGS. 3A and 3B takes advantage of a mapping between gravity, the orientation of the device 801, and the orientation of the arena 350 displayed on the device 801.

Establishing constraints which may be used to configure the virtual camera in step 220, will now be described with reference to FIGS. 4A, 4B and 4C.

Figure 4A:
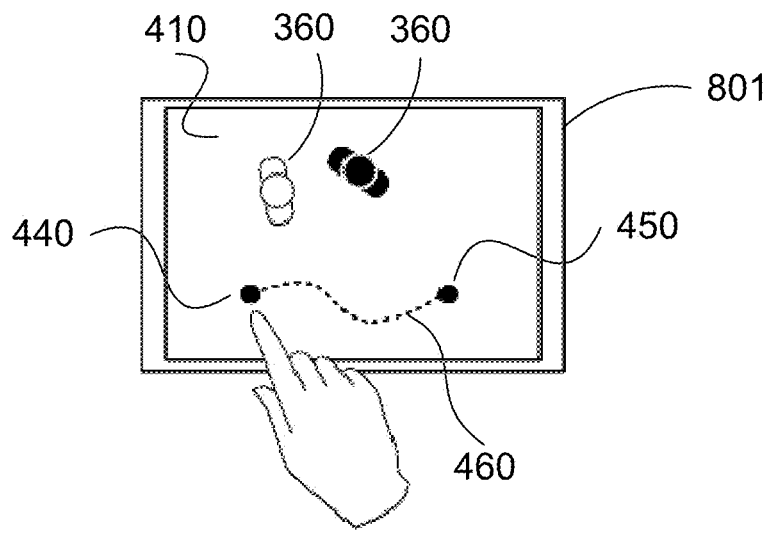
FIG. 4A shows an example of a path traced between two end points using a touch gesture on an example arrangement of the electronic device.

FIG. 4A shows an example of a path 460 traced between two end points 440 and 450, using a touch gesture, in another example arrangement of the device 801. The path 460 is used to determine locations in the scene 410. In one arrangement, only the start and end points are specified by the user, and the path is inferred by the device 801. For example, the path may be inferred to be a straight line. In another arrangement, multiple points (e.g. more than two (2) points), are specified by the user, and the path is inferred to pass through those points. For example, the path may be inferred to pass through the multiple points using linear interpolation, cubic interpolation, or some other suitable interpolation method. In a further arrangement, multiple points correspond to physical cameras viewing the scene, and a path is interpolated between the multiple points so as to pass through the multiple points. In yet another arrangement, the path 460 is swept out by finger gestures of the user, fully specifying the whole length of the path. A visual representation of the determined path (e.g., 460) may also be shown interactively to the user, and later editing or other refinement of the path may be performed.

A path such as the path 460 may be used in several ways to configure the virtual camera controls. For example, the path 460 may be used to control the possible positions of the virtual camera during subsequent user interactions, acting as a 'guideline' or a 'rail' on which the virtual camera may move back and forth. In the case where the path 460 is used to control possible positions of the virtual camera during subsequent user interactions, when the device 801 has moved from a first to a second orientation, the controls may be configured so as to only respond to left and right gestures to move the virtual camera along the path (i.e. other gestures may be ignored by the controls).

In another arrangement, the height of the virtual camera above the scene may be constrained using the path information. In the case where the height of the virtual camera is constrained using the path, when the device 801 has moved from a first to a second orientation, the controls may be configured to allow the virtual camera to move through the scene. However, the height of the virtual camera is not controlled in the second orientation view (e.g., the view shown in FIG. 3B) by the user but is instead determined based on the path information.

In another arrangement, while the position of the virtual camera is freely controlled by the user, the rotation of the virtual camera in a second orientation may be constrained to follow a point in a scene corresponding to a path defined by the user in a first orientation. The path may be defined by the user as a path in time. For example, such a path may correspond to displacement of an object of interest or an area of interest in the scene. Time may also be added as a constraint, as will be described below.

Multiple paths may be specified using one or more of the above methods. Methods of moving between the various paths may be provided to the user, either at step 220, or at step 250, or both. Implicit methods may also be used to infer which path or paths are significant for the configuration of virtual camera controls. In one arrangement, the spatial locations corresponding to a path may affect how controls operate, for example, when a path is near goal zones in a soccer game certain controls may function. For example, there may be a slider control that rotates the virtual camera in a circular arc around the goal while keeping the virtual camera pointing at the goal, or there may be a slider control that acts to zoom the virtual camera in towards the goal. There are many spatially-aware controls that may be defined.

In another arrangement, paths have a temporal component, and the navigation of time by a user during step 250 may disable certain controls corresponding to one path and enable other controls corresponding to another path. For example, if there is a first path running along the length of a football stadium, and a second path circling a goal at one end of the stadium, during the time at which the virtual camera is being navigated along the first path, left and right controls may suffice to control motion of the virtual camera along the length of the stadium; while up and down controls may affect zoom of the virtual camera. However, upon reaching the time corresponding to the second path, motion upwards may be allowed so as to show the goal from on high, where the up and down zoom controls for the first path may be disabled and the up and down height controls corresponding to the second path may become enabled at this time. There are many other temporally-aware controls that may be defined.

Figure 4B:
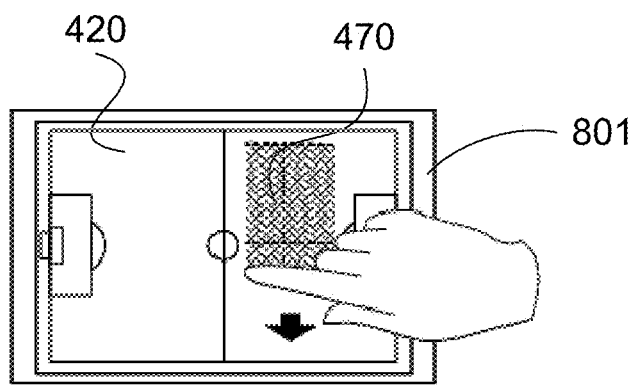
FIG. 4B shows an example of a user sweeping out an area to be used when configuring a virtual camera using another example arrangement of the electronic device.

FIG. 4B shows an example of a user sweeping out an area 470 to be used when configuring the virtual camera using another example arrangement of the device 801. The area 470 is used to determine locations within the illustrated scene 420. There are several methods to sweep out an area on a touchscreen. Opposite corners may be indicated via two touch gestures. A perimeter of a shape may be traced. If a touch sensor being used by the device 801 is capable of detecting multiple touches simultaneously, the placement of multiple fingers may be used to specify a rectangle or other shape. Similarly, the area 470 may be traced by moving the flat surface of a finger along the display screen 814. Interpolation methods as described above may also be used to fill in missing information. A representation of the area 470 may be shown to the user and interactive editing may be allowed.

An area such as the area 470 may be used to determine locations within the scene 420 that may be used to configure the virtual camera controls. In one arrangement, the area 470 is used as a boundary within which the virtual camera is constrained to move. For example, when the device 801 is in the second orientation as described above, controls may be made visible and enabled that allow the user to move the virtual camera left, right, forwards, or backwards. However, the controls may be constrained in such a way that when the position of the virtual camera reaches an edge of the boundary area defined previously while the device 801 was in a first orientation, the corresponding control becomes unresponsive to further user input so as to prevent the virtual camera from exiting the boundary area. The corresponding control may however become responsive again once the virtual camera moves away from the edge of the boundary area defined previously.

In another arrangement, the area 470 may be used to constrain the field of view of the virtual camera such that orientation of the virtual camera cannot change to view parts of the scene outside designated locations. Constraining the field of view of the virtual camera may be useful when viewing an area of importance, such as a goal zone. For example, when the device 801 is in the second orientation as described above, controls may be made visible and enabled that allow the user to rotate the virtual camera left, right, up, down, or zoom in or out. However, the controls may be constrained in such a way that when the field of view of the virtual camera strays outside the goal zone, the corresponding control becomes unresponsive to further user input while continued rotation in that direction would produce a view that is outside the previously designated area 470. In another example, the controls do not become unresponsive, but become progressively less responsive the closer to the outside of the area the user navigates, enforcing a slowing down that warns the user of impending violation of constraints imposed by the input area 470.

Figure 4C:
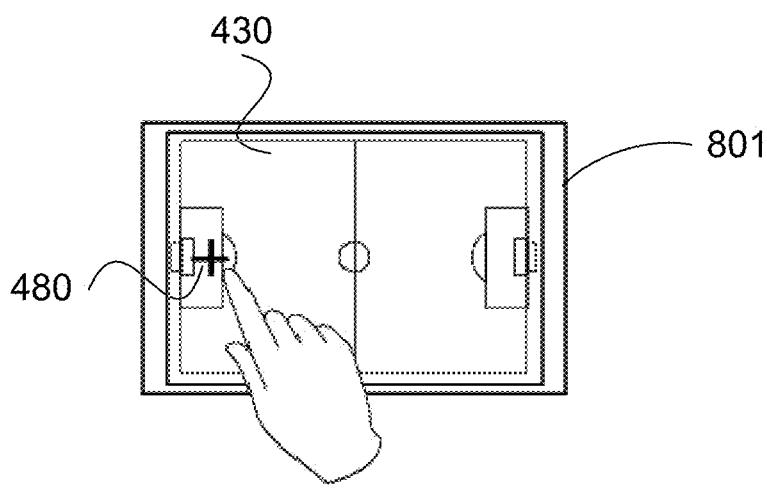
FIG. 4C shows an example of a gesture for indicating a single location or object in the representation of a scene using another example arrangement of the electronic device.

FIG. 4C shows an example of a gesture for indicating a single location or object 480 in the representation of the scene 430 using another example arrangement of the device 801. A single touch gesture identifies a location within the scene or an object in the scene which is to be viewed by the virtual camera, such that that location or object remains within view of the virtual camera. Such a single touch gesture identifying a location within the scene or an object constrains the rotation of the virtual camera to always point at the location or object, while still allowing the virtual camera to move around the location or object or away from the location or object. Any suitable method for tracking a moving object may be used to follow such objects over time, including, for example, optical tracking, optical character recognition to read letters or numbers printed on the object, or the use of radio frequency tags attached to the object. In one arrangement, the zoom of the virtual camera may be automatically controlled to ensure the object or location is framed so as to substantially fill the view, or so as to obey other framing constraints (such as the rule of thirds). In another arrangement, a gesture circling an object may be used to indicate the same, or the circling of multiple objects may indicate that all of the objects should be kept in view by the virtual camera. In still another arrangement, one of the abovementioned gestures may be used to indicate that the virtual camera can remain a fixed distance from an object or a location, orbiting the object or location in response to user inputs but still focusing on the object or location.

The association of temporal information with the locations determined through user interaction in step 220, will now be described with reference to FIGS. 5A, 5B and 5C.

Figure 5A:
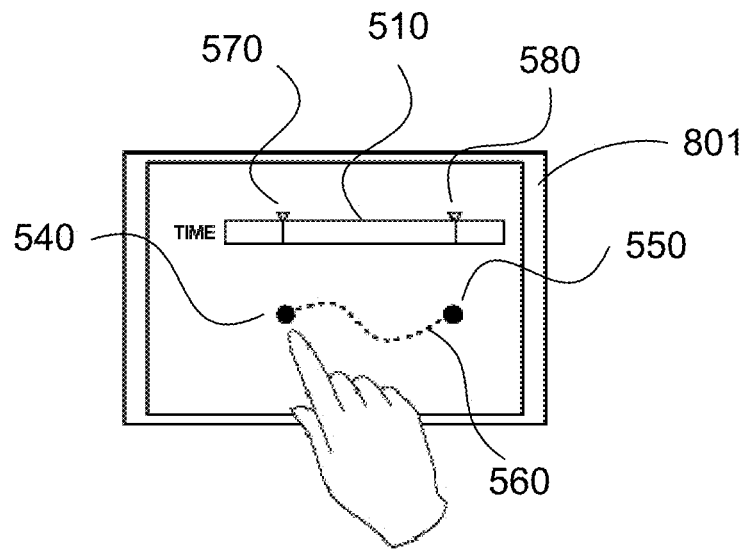
FIG. 5A shows a user interaction creating a path which is also associated with a timeline control, in one arrangement of the electronic device.

FIG. 5A shows a user interaction creating a path 560 which is also associated with a timeline control 510, in one arrangement of the device 801. An end point 540 of the path 560 may be associated with a particular time marker 570 on the timeline control 510, and the other end point 550 associated with another time marker 580. The markers 570 and 580 may be pre-set, or inferred through the action of inputting the path 560, or assigned in some other way. The user may have the opportunity to move the time markers 570 and 580 later. The time markers 570 and 580 typically indicate the time in the scene where points on the path 560 are to be assigned. The time markers 570 and 580 thus provide the locations determined from the path 560 with a temporal component in addition to any spatial or rotational components that the locations may have. By marking the time with which points on the path 560 correspond, the speed at which movement of the virtual camera along the path 560 will occur may be inferred. Furthermore, by allowing the time markers 570 and 580 to be moved, it is possible to vary the speed at which the virtual camera will move along the path 560. For example, if the start of a path has a time marker at ten (10) seconds, and the end of the path has a time marker at thirty (30) seconds, it is possible to infer that the path is twenty (20) seconds long. Continuing the example, it is also possible to infer that the speed of the virtual camera along that path will be the path distance divided by twenty (20) seconds. Manipulating the time markers 570 and 580 may change that time interval, and thus the speed, allowing the user to control when in the scene the path 560 will start or end, thus allowing control of framing of significant scene events in time. In another arrangement, more than two time markers, corresponding to different points on the path 560, may be used to independently vary the speeds along different sections of the one path.

Holding a finger on the touchscreen of the device 801 may be used to establish a path. While the finger is held down on the touchscreen of the device 801, scene time may be played forward such that objects displayed in the scene can be seen moving, and thus the path may be traced while time moves onwards. In another arrangement, time only moves onwards when the finger moves.

Temporal components at points on the path 560 not explicitly given a time marker may be inferred through various means, including using linear or cubic interpolation or any other suitable method. Typically, the start time marker and end time marker stipulate the scene time of the points on the path 560. In one arrangement, only the start and end points of the path 560 need be assigned time markers, with all intermediate locations along the path 560 being assigned an inferred time.

In another arrangement, the start and end points and one or more additional points on the path 560 are assigned time markers, and a cubic Hermite spline interpolation method is used to ensure that additional points match the assigned times. The cubic Hermite spline interpolation method is also used to ensure that the apparent acceleration of the virtual camera through that location at that time is smooth.

As described earlier when discussing FIG. 4, a path may be straight, curved, orbital, or some other shape, and may include just end points, or a number of intermediate points. In one arrangement, the path 560 is input by adding two or more points using touch gestures. For each point on the path 560, a corresponding time marker may be added to the timeline control 510, and then both the intermediate spatial components and the intermediate temporal components of the locations of the path 560 may be inferred through interpolation methods. Adding corresponding time markers to the timeline control 510, for each point on the path 560 provides a one-to-one correspondence of spatial locations indicated on the path 560 to the corresponding time markers on the timeline control 510. The timing of spatial locations may then be adjusted by moving the corresponding time marker on the timeline control 510. For example, if the midpoint of a path was marked with a time marker, moving that marker so that the marker is closer in time to the time marker denoting the start of the path causes the first half of the path to be traversed faster than if the same time marker were moved so the time marker is closer in time to the time marker denoting the end of the path. Colour coding or other highlighting mechanisms may be used to inform the user of correspondences between path locations and time markers. For example, a path may be marked at various points with dots of different hues when the device 801 is in the first orientation, and when the device 801 is in the second orientation the corresponding hues are used on the time markers corresponding to the various points.

Figure 5B:
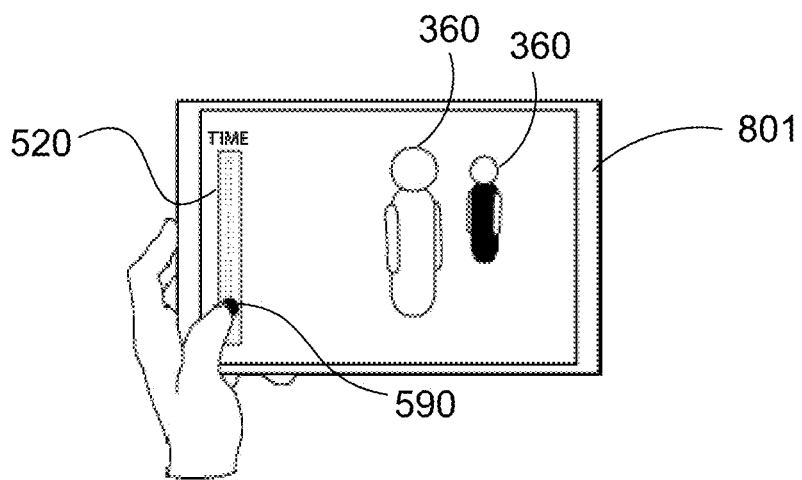
FIG. 5B shows a time slider displayed on the electronic device.

FIG. 5B shows a time slider 520 displayed on the device 801 for use with a virtual camera path as previously established in step 220. In the example of FIG. 5B, it may be desirable to frame a virtual camera view in step 250 such that certain objects 360 in the scene are seen continuously, for example, to ensure that a ball being kicked between two players does not go out of view. The time slider 520 may be displayed on the device 801 after a change in orientation of the device 801 is detected in step 230, such that the user has already established a path or selected an object to view in step 220. With the time slider 520 displayed on the device 801, the user may now control the virtual camera in step 250 using controls configured in step 240.

A time slider 590 on the timeline 520 is used to move along the previously generated path 560 by increasing or decreasing the scene time. For example, the virtual camera may be configured to automatically follow an object at a certain distance, and through manipulation of the time slider 590 the user can preview the resultant video.

In another arrangement, the spatiotemporal locations of the virtual camera are determined in step 220 as in FIG. 5A by a path 560; and now in step 250 as shown in FIG. 5B the user may control the framing of the virtual camera viewing objects 360 in the scene by adjusting the orientation of the virtual camera through changing the orientation of the device 801 in a corresponding fashion. In the example of FIG. 5B, the spatial movement of the virtual camera through the scene during step 250 is matched to the path previously determined in step 220. The path previously determined in step 220 is in turn matched to the time markers 570, 580, established earlier also in step 220. Thus, the control of the time slider 590 by the user during step 250 suffices to control the spatial location of the virtual camera in the scene, merely by sliding a thumb along the timeline 520. Using the time slider 590 frees the user in step 250 to concentrate on framing the video correctly, using the motion of the device 801 to do so.

Figure 5C:
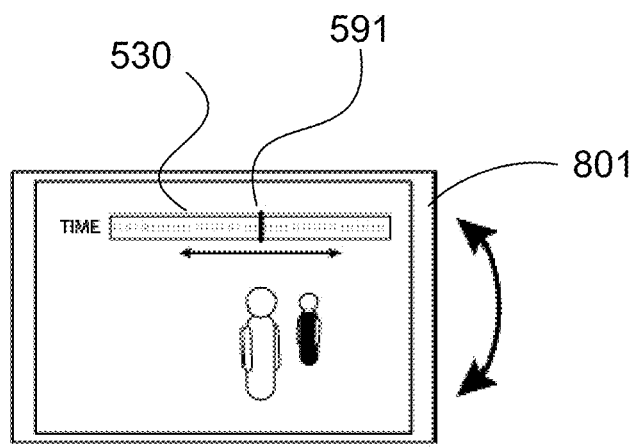
FIG. 5C shows a timeline displayed on the electronic device.

FIG. 5C shows additional methods of controlling the timing of playback. In the example of FIG. 5C, a timeline 530 is displayed on the device 801. The timeline 530 features a time indicator 591 which updates as the user navigates scene time. The user may navigate time by tilting the device 801 clockwise or anticlockwise, and the time indicator 591 moves forward or backwards, respectively. In another arrangement, gaze tracking may be used to allow the user to sight a spot on the timeline 530 and correspondingly the device 801 may set the time indicator accordingly, and thus move the time indicator 591 to the appropriate place along the previously determined path. In another arrangement, the user may initiate playback through some means, such as a play button, a gesture, or implicitly by waiting for a short duration. Time may then automatically step forward while the user manipulates the device 801 so as to control the virtual camera.

Multiple paths, areas, objects of interest, or locations may be specified by the user during step 220. Temporal components (timecodes) of such locations may be used to select how controls respond or which controls are enabled or shown to the user. In an arrangement, multiple paths are defined by the user, each path having associated time periods. The user first inputs one path which determines first locations, which are displayed. The user inputs a second path which is also displayed. Timing of each of the paths is input by the user. When the user controls the virtual camera during step 250, the temporal component (timecode) of the virtual camera is checked. During the time period corresponding to the first path, the controls are configured according to the locations of the first path, and during the time period corresponding to the second path, the controls are configured according to the locations of the second path. If there is an overlap in the time periods, the earlier time period must be exceeded by the temporal component of the virtual camera before the virtual camera controls of the later time period are in operation. The time period overlap may be used to implement a "jump cut" between a first path and a second path. In another arrangement, controls corresponding to both paths may be enabled during any time period overlap. Enabling controls corresponding to both paths during any time period overlap may be used to allow a rail-like camera motion along a field to smoothly transition into an orbital camera motion near a goal zone.

There are many other possible mappings of device motion, gesture, or other input that may be used to navigate scene time and/or path time after prior establishment of a path, location, or object to follow. As described above, the described methods separate prior establishment of locations in step 220, followed by a change to a navigation mode via an orientation change in step 230, followed by the configuring of controls in step 240 and constrained virtual camera navigation in step 250.

Figure 6A:
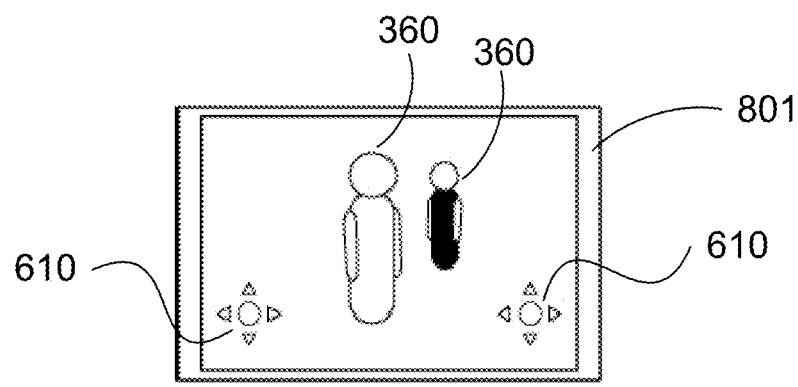
FIG. 6A shows visible navigation controls displayed on a touchscreen of the electronic device.

FIG. 6A shows visible navigation controls 610 on the touchscreen of the device 801. The visible navigation controls 610 can be placed so that touch gestures of a user can be conveniently input and used to navigate the virtual camera during step 250.

One set of controls may cause the virtual camera to be angled up, down, left, or right. Another set of controls may cause the virtual camera to move left, right, forward, or backward, which may be the case if the user is navigating within an area defined earlier while the device 801 was in a first orientation. In another arrangement, both sets of controls may cause the virtual camera to move left or right or angle up or down, which may be the case if the virtual camera is constrained to move along a path defined earlier while the device 801 was in a first orientation. The controls and their sub-components may be configured to be visible or invisible, enabled or disabled, or variably responsive to user input, in accordance with previously established locations, paths or areas.

In one arrangement, in step 220, the user has indicated an area 470, as shown in FIG. 4B. Controls can be configured in step 240 such that the virtual camera cannot look outside the area 470 during step 250. Such a constraint may be imposed by ensuring that controls that would move the virtual camera too far away from the area or point the virtual camera in the wrong direction are prevented from doing so. For example, the controls may become unresponsive to user inputs in such a situation.

In a system which has the manual controls described above, the passage of scene time may be implicitly controlled by the device 801, for example, in a one-to-one correspondence with the experienced passage of time of the user. Alternatively, scene time may be slowed, so as to allow the user time to construct the proper framing of a shot.

In one arrangement, one of the navigation controls 610 has an axis that controls time. For example, the left hand control may adjust scene time on the horizontal axis, and adjust virtual camera zoom on the vertical axis. Scene time may be controlled continuously, possibly exponentially, for example, using multiple levels of fast forwarding or reversing speeds. For example, holding a finger down on one time control may begin moving time forward at a normal speed. However, the longer the finger is held down, the faster that speed becomes, producing a "fast-forward" effect until the user lets go. In another arrangement, the passage of time may be linear, such that holding down one time control only ever moves at a single speed.

In one arrangement, the configuration of such temporal controls to behave in a linear or an accelerating or exponential manner may depend on the length of a path described while the device 801 was in a first orientation. For example, a long path may cause the controls to behave in an exponential manner while a short path might not.

In yet another arrangement, the passage of time is not continuous, but involves disjoint steps. The disjoint steps possibly correspond to unique spatiotemporal points expressed previously when establishing a path, as described above in relation to FIG. 5A. For example, tapping the rightwards time control may advance the scene time to the next point used when defining the path, while tapping the leftwards time control may reverse the scene time to the previous such point. In one arrangement, such a mapping of controls to temporal navigation may be configured as a result of detecting while the device 801 is in a first orientation that the user is describing a path, as opposed to an area.

In an arrangement, the controls select one or more objects 360 to follow or display. For example, touching a control may step through the objects near to a previously established path at that point in time, enabling the orientation of the virtual camera to be slaved to the apparent motion of the selected object in the field of view. In another arrangement, touching the controls may step through the objects within the previously established area at that point in time. In still another arrangement, touching a control may step through several previously established paths or areas, selecting objects related to each.

Explicit time navigation controls of the form discussed in relation to FIG. 5 may be used in addition to touch-operated virtual camera controls of the kind shown in FIG. 6A. Configuration of the controls during step 240 may be established as a result of the previous input of a user in step 220 being used to determine locations in the scene. The previous input may be used to inform the configuration of the controls and thereby allow simplified navigation and control of the virtual camera during step 250.

Figure 6B:
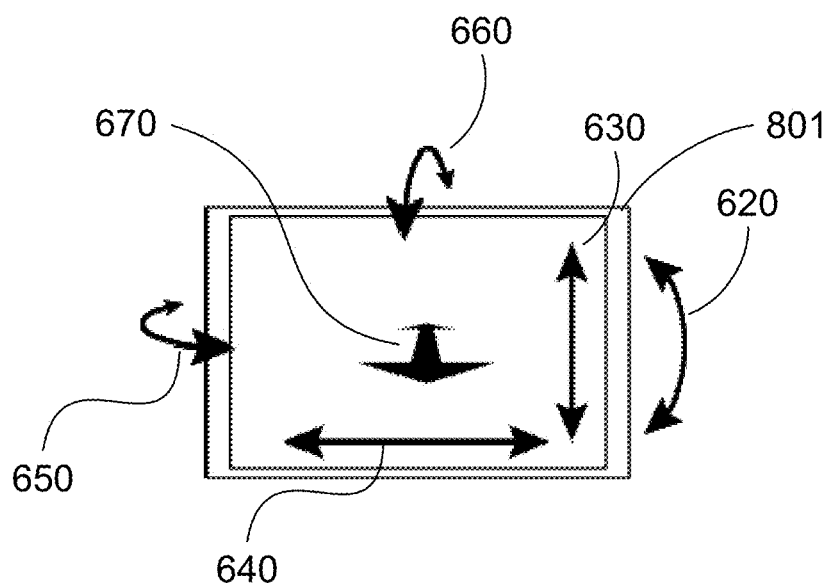
FIG. 6B shows movements that may be used to control the virtual camera using the electronic device.

FIG. 6B shows movements that may be used to control the virtual camera. In the example of FIG. 6B, the user moves the device 801, and the movements are sensed by the device 801. Various movements are contextually associated with control operations that adjust the virtual camera properties, such as spatial coordinates, rotational values, temporal coordinates and zoom value. Movements may include moving the device 801 up and down 630, sideways 640, closer or further away 670, or rotating the device 801 clockwise or anticlockwise 620. Movements may also include tilting the device 801 horizontally 650 or vertically 660, and there may be other forms of movement that the device 801 may reliably sense.

The movements 620, 630, 640, 650, 660 and 670 of the device 801 as shown in FIG. 6B may be used to control the virtual camera. For example, sideways movement 640 may be used to move the virtual camera sideways within the scene. Similarly, tilting 660 the device 801 upwards may angle the virtual camera upwards. However, an important feature of the movement controls may be configured in step 240 in response to the previous input of the user in step 220 which has established locations within the scene.

In one example, the user may have previously established a path in step 220 for the virtual camera to follow. Thus, when the virtual camera is being directly controlled by the user in step 250, the movements of the device 801, as shown in FIG. 6B, would affect the virtual camera in ways that accord with the earlier established path. For example, the path established in step 220 may effectively constrain the spatial position of the virtual camera during step 250, while not constraining the rotational angles of the virtual camera. The movements of the device 801 may be interpreted as affecting the rotations virtual camera, but would not change the position of the virtual camera if doing so would take the virtual camera off the previously established path. Thus, the user is free to concentrate on providing the virtual camera steering needed to correctly control the virtual camera, through the separate provision of location information in an earlier step 220, and configuration of the virtual cameras 240 to be used in a later step 250.

One or more of the possible kinds of device motion may be associated with a method of navigating time, as described above is relation to FIG. 5C. For example, rotation 620 of the device 801, instead of causing the virtual camera to rotate, may be used to navigate scene time, and thus to move the virtual camera back and forth along a predefined path. In another example, tilting the device 801 forward may be used to step to the next predefined path or area, triggering a "jump cut" to another part of the scene, and a reconfiguration of other controls to accord with that path or area. For example, stepping to an area at the sidelines of a football game may reconfigure the controls to best illustrate a throw-in, configuring the controls to allow the virtual camera to be moved along the sidelines or angled up or down so as to frame a shot.

In one example, in step 220 the user has selected an object to view. The virtual camera is directed to remain a fixed distance from the object, but to frame the object within view. Thus, as the object moves in the scene, the virtual camera will follow the object and view the object from a fixed distance. However, the following of the object has not constrained the angle from which the object is to be viewed. In this example, the virtual camera controls may be configured in step 240 such that in step 250 when the user is interactively controlling the virtual camera, sideways motion 640 or rotation 650 of the device 801 is interpreted as a command to spin the virtual camera around the object, so as to view the object from a different angle. Spinning the virtual camera around the object, so as to view the object from a different angle, as described above, may be used to ensure that aspects of the object (e.g., a player's face, a ball, a player's leg, a tackle, an intercept) can be observed properly.

Swipe gestures may be used to perform similar constrained virtual camera navigation operations. For example, in a game of quidditch, it might be desirable to see the golden snitch from the point of view of the player chasing the snitch. In the example, the player playing as 'the seeker', may be selected in step 220, so that the virtual camera controls are configured accordingly to allow the user in step 250 to frame any additional objects suitably. The user may frame any additional objects by configuring the controls to allow rotation left, right, up and down, as though the user was riding on the back of the broomstick. To maintain the illusion that the user is travelling with the seeker, configuring the controls such that motion left and right which would take the virtual camera off the broomstick may be undesirable.

The configuration step 240 which configures virtual camera controls may operate in various ways. The configuration step may affect the interpretation of the user gestures or device movements within step 250. The correspondence between movements of the device 801 and the motion of the virtual camera may be changed depending on whether a path or an orbit has been previously selected by the user. For example, a path might configure the controls such that rotations of the device 801 effect rotations of the virtual camera, but spatial movements of the device 801 do not modify the virtual camera's spatial position. As another example, an orbit around a player in a game might configure the controls such that rotations of the device 801 cause the virtual camera to spin around the orbited player, while moving the device 801 forwards and backwards changes the radius of the orbit.

Alternatively or in addition, the configuration step 240 may be used to apply limits to the expressible range of inputs that the user can apply through controls during step 250. For example, if a number of user defined points are given in step 220 to be used to infer a path, that same number of points may be discretely selectable during step 250 (e.g., by pressing a touch control several times). Alternatively, swipe gestures may be accepted to switch between the points, so as to allow the framing of each of the points to be adjusted. The number of times the swipe gesture can be used may be limited by the number of points entered during step 220. Similarly, the range of motion of a virtual camera may be determined by analysis of user input in step 220, and the control of the virtual camera by the user may limited by step 240 such that the rate of device motion during step 250 is scaled to match the allowed motion of the virtual camera.

Similarly, configuration step 240 may be used to modify the appearance of controls such that visibility, responsiveness, or the extent of control of the controls is limited. For example, a slider may grow longer or shorter such that the slider corresponds to the available spatial or temporal range allowed. In one arrangement, allowable virtual camera movement directions from all movement directions of the virtual camera may be selected, and virtual camera controls for the allowable movement directions may be displayed on the display 814 of the device 801.

Figure 7:
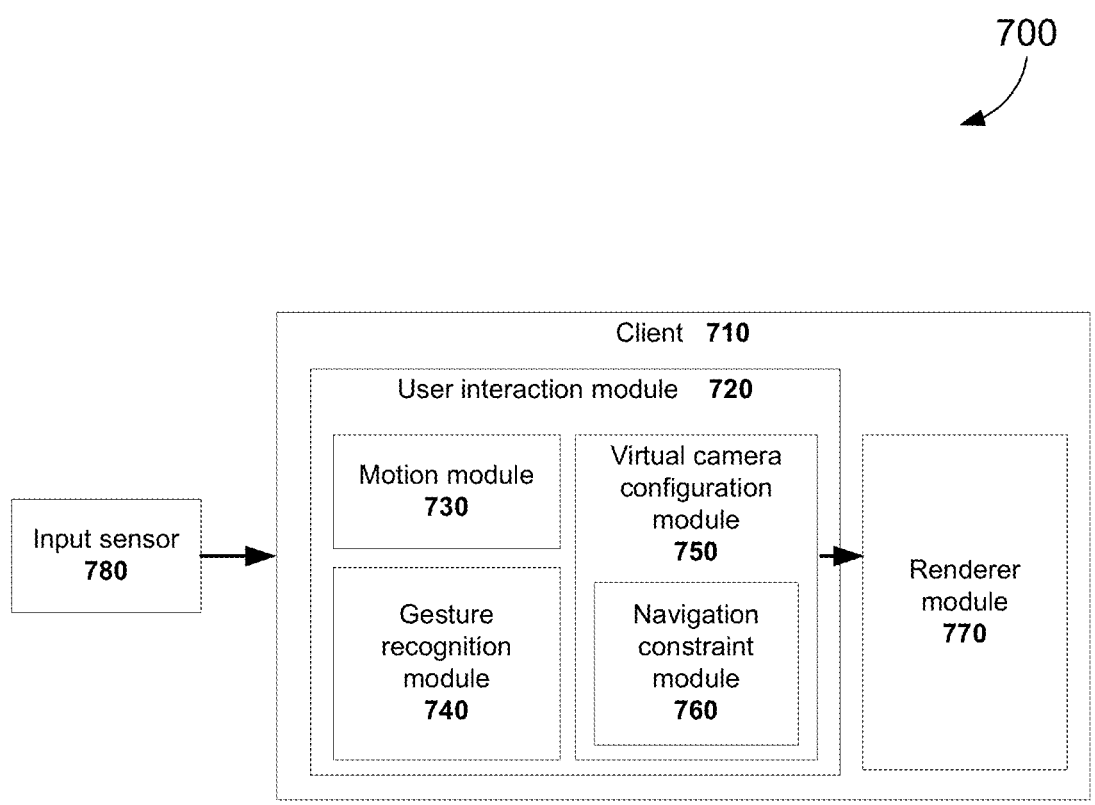
FIG. 7 shows a system that accepts user gestures and/or device motions to configure and control virtual camera navigation.

FIG. 7 shows a software architecture 700 which may be used to implement the described methods. An input sensor 780 supplies input of the user to the system 100. Client software 710 implements several software modules. The client software 710 may be implemented as one of more software code modules of the software application programs 833 resident in the ROM 860 and/or RAM 870 and being controlled in their execution by the processor 805. In the software architecture 700 of FIG. 7, a user interaction software module 720 contains several software modules. A motion module 730 is responsible for modelling the motion of the device 801 and/or user, so as to provide other modules with knowledge of motions. A gesture recognition module 740 may use inputs from the input sensor 780 and/or motion module 730 to recognise gestures of the user. A virtual camera configuration module 750 is responsible for managing the configuration of parameters of the virtual camera and also the controls associated with the virtual camera. A navigation constraint module 760 configures controls so as to implement constraints and optionally constrains the parameters of the virtual camera so as to implement constraints on the operation of the virtual camera. The outputs of the virtual camera configuration module 750 inform a renderer module 770 how to render controls, virtual camera results, the scene, and so forth on the display 814 for example.

The arrangements described are applicable to the computer and data processing industries and particularly for the video broadcast industries. The arrangements described are particularly suited to live broadcast applications such as sports or security, and home users for entertainment purposes.

The arrangements described provide an advantage of allowing a user to generate a virtual camera in near real-time as action progresses. The user may configure the virtual camera with ease in one orientation of the device 801, and control various parameters of the virtual camera (e.g., location, direction and movement). Further, the arrangements described may be implemented without comprising a specialty controller. In contrast, a device 801 such as a tablet may be used to configure the virtual camera interactively.

In one example application, a producer is watching footage of a soccer game and can direct a virtual camera to follow as a ball is passed to a particular player. The producer can then configure a virtual camera to correctly frame the action in a natural way while ensuring that earlier constraints or configurations are respected.

The methods described above have been described with reference to controlling a virtual camera. However, the described methods may be used for controlling any remote device which may take the form of a virtual camera or a physical camera (e.g., 120A).

The foregoing describes only some embodiments of the present invention, and modifications and/or changes can be made thereto without departing from the scope and spirit of the invention, the embodiments being illustrative and not restrictive.

The invention claimed is:

1. A display apparatus configured to display an image of a scene, the display apparatus comprising:
   one or more hardware processors; and
   one or more memories which store instructions executable by the one or more hardware processors to cause the display apparatus to perform at least:
   identifying an orientation of the display apparatus;
   determining, based on the identified orientation of the display apparatus, a display mode to be applied from among a plurality of display modes including a first display mode in which an image representing the scene viewed from a predetermined position is displayed and a second display mode in which an image representing the scene viewed from a position designated by user input received by the display apparatus in the first display mode is displayed; and
   displaying an image of the scene, applying the determined display mode.

2. The display apparatus according to claim 1, wherein the image displayed in the second display mode is a virtual viewpoint image generated based on a plurality of images of the scene captured from different directions by a plurality of cameras.

3. The display apparatus according to claim 1, wherein in the determining, the first display mode is determined to be applied in a case where a difference between the identified orientation of the display apparatus and a predetermined orientation is less than a threshold.

4. The display apparatus according to claim 3, wherein in the determining, the second display mode is determined to be applied in a case where a difference between the identified orientation of the display apparatus and the predetermined orientation is greater than the threshold.

5. The display apparatus according to claim 1, wherein the display apparatus comprises a touchscreen, and the received user input is based on one or more gestures applied to the touchscreen.

6. The display apparatus according to claim 3, wherein a direction of gravity is perpendicular to a display plane of the display apparatus in the predetermined orientation.

7. The display apparatus according to claim 6, wherein the image displayed in the first display mode represents a top-down view of the scene from the predetermined position that is determined independently from a position of a viewpoint corresponding to an image displayed in the second display mode.

8. The display apparatus according to claim 1, wherein a plurality of locations in the scene is determined based on the received user input.

9. The display apparatus according to claim 8, wherein the locations are used to constrain the motion of a viewpoint corresponding to an image displayed in the second display mode.

10. The display apparatus according to claim 8, wherein the locations define an area constraining where a viewpoint corresponding to an image displayed in the second display mode can be positioned.

11. The display apparatus according to claim 8, wherein the locations define a path along which a viewpoint corresponding to an image displayed in the second display mode can be moved, the path defining a plurality of points and a transition between the points.

12. The display apparatus according to claim 11, wherein the path is at least one of a straight line, a curve, an orbit.

13. The display apparatus according to claim 8, wherein the instructions further cause the display apparatus to perform:
   determining a path using the locations in the scene such that the path passes through locations of cameras viewing the scene; and
   moving a viewpoint corresponding to an image displayed in the second display mode along the determined path.

14. The display apparatus according to claim 8, wherein each of the plurality of locations is associated with a corresponding viewing time, the viewing time controlling speed of transitions between points.

15. The display apparatus according to claim 8, wherein the instructions further cause the display apparatus to perform:
   detecting, at an interface, a second user input determining second locations in the scene,
   displaying an indication of the first locations and the second locations; and,
   when the temporal component of a viewpoint corresponding to an image displayed in the second display mode exceeds the temporal component of all first locations, configuring the viewpoint controls in accordance with the second locations.

16. The display apparatus according to claim 15, wherein the instructions further cause the display apparatus to perform determining a transition between the first locations and the second locations based on corresponding constraints.

17. The display apparatus according to claim 1, wherein the position designated by the user input corresponds to an object in the scene, and a viewpoint corresponding to an image displayed in the second display mode maintains a position relative to the object as the object moves in the scene.

18. The display apparatus according to claim 1, wherein both the designated position and a viewpoint of an image displayed in the second display mode include a spatial component and a temporal component.

19. The display apparatus according to claim 18, wherein the instructions further cause the display apparatus to perform interpolating locations using at least one of the spatial components and the temporal components.

20. The display apparatus according to claim 1, wherein the instructions further cause the display apparatus to perform:
   changing an orientation of a viewpoint of an image displayed in the second display mode depending on a change in an orientation of the display apparatus.

21. A non-transitory computer-readable medium having a computer program stored thereon for executing a method to control a display apparatus, the method comprising:
   identifying an orientation of the display apparatus;
   determining, based on the identified orientation of the display apparatus, a display mode to be applied from among a plurality of display modes including a first display mode in which an image representing the scene viewed from a predetermined position is displayed and a second display mode in which an image representing the scene viewed from a position designated by user input received by the display apparatus in the first display mode is displayed; and
   displaying an image of the scene, applying the determined displayed mode.

22. A tablet device adapted to display an image of a scene, comprising:
   a touchscreen;
   a memory;
   a processor configured to execute code stored on the memory to:
   identify an orientation of the tablet device;
   determine, based on the identified orientation of the tablet device, a display mode to be applied from among a plurality of display modes including a first display mode in which an image representing the scene viewed from a predetermined position is displayed and a second display mode in which an image representing the scene viewed from a position designated by user input on the touch screen in the first display mode is displayed; and
   display an image of the scene, applying the determined display mode.

23. A method of controlling a display apparatus for displaying an image of a scene, the method comprising:
   identifying an orientation of the display apparatus;
   determining, based on the identified orientation of the display apparatus, a display mode to be applied from among a plurality of display modes including a first display mode in which an image representing the scene viewed from a predetermined position is displayed and a second display mode in which an image representing the scene viewed from a position designated by user input received by the display apparatus in the first display mode is displayed; and
   displaying an image of the scene, applying the determined display mode.

24. The method according to claim 23, wherein the image displayed in the second display mode is a virtual viewpoint image generated based on a plurality of images of the scene captured from different directions by a plurality of cameras.

* * * * *